United States Patent [19]

Fretwell

[11] 3,879,579

[45] Apr. 22, 1975

[54] AUTOMATIC DIRECT ACCESS ARRANGEMENT SELECTOR

[75] Inventor: Richard D. Fretwell, Grove City, Ohio

[73] Assignee: MI², Incorporated, Columbus, Ohio

[22] Filed: Mar. 21, 1973

[21] Appl. No.: 343,208

[52] U.S. Cl. .............................................. 179/2 DP

[51] Int. Cl. .......................................... H04m 11/06

[58] Field of Search ........... 179/2 C, 1 C, 6 E, 2 DP

[56] References Cited

UNITED STATES PATENTS

| | | | |
|---|---|---|---|
| 3,193,620 | 7/1965 | Marheine | 179/6 E |
| 3,649,759 | 3/1972 | Buzzard et al. | 179/2 DP |

*Primary Examiner*—William C. Cooper
*Assistant Examiner*—C. T. Bartz
*Attorney, Agent, or Firm*—Cennamo Kremblas & Foster

[57] ABSTRACT

A circuit providing automatic or manual selection of and connection of a data terminal to one of two alternative direct access arrangement terminal units. A four pole double throw relay is actuated by a logic circuit when a ring signal occurs at a first terminal unit or when the first terminal is manually selected to connect the data terminal to the first terminal unit. Otherwise, the relay is not actuated and connects the data terminal to the second terminal unit.

10 Claims, 2 Drawing Figures

AUTOMATIC DIRECT ACCESS ARRANGEMENT SELECTOR

BACKGROUND

This invention relates generally to the logic circuitry of a modem or data set and more particularly relates to a circuit which permits an entire data terminal to automatically operate in co-operation with two different direct access arrangement or DAA terminal units.

Data is commonly communicated between local and remote data terminals through intersecting transmission lines. Ordinarily, these transmission lines are part of a network and are terminated at a direct access arrangement terminal unit. Such DAA terminal units provide convenient connectors for connecting to the data terminals and permit added operational functions.

Occasionally, a data terminal facility will have access to two separate transmission lines or networks and therefore will have two DAA terminal units available for connection to the data terminal. For example, the data terminal may have access to the telephone company's exchange-type service known as DATA-PHONE, a TWX service or a private line service.

Modern data terminals are equipped with data sets which modulate and demodulate the transmitted signals. The data sets also have control logic circuitry which permits the terminal to automatically answer a call and then transmit data to a remote terminal. Such automatic answer capability eliminates the need for attending personnel.

There is therefore a need for a circuit which permits such automatic answering by a data terminal and which also permits the data terminal to automatically answer and communicate over either of two available transmission line networks.

SUMMARY OF THE INVENTION

The invention is a circuit for selecting and alternatively connecting a data terminal to one of two DAA terminal units. The data terminal includes a ring detector connected to a first of the DAA terminal units for shifting from a first to a second logic level in response to a ring signal. The data terminal further includes an OH circuit for shifting its output from a first to a second logic level when the data terminal goes off hook. The circuit of the invention has a multiple pole, double throw, electrically operated switch means, such as a relay, connected to the DAA terminal units. This switch means has wiper terminals connected to the data terminal and connects the Data terminal to a first one of the DAA terminal units when the switch means is actuated and connects the data terminal to the other DAA terminal unit when the switch means is not actuated. A logic circuit means is connected to the switch means and has inputs connected to the output of the ring detector and the output of the OH circuit. The logic circuit means actuates the switch means in response to the simultaneous existence of the ring signal at the ring detector and an on hook state and holds the switch means in an actuated state in response to the simultaneous existence of an off hook state and an actuated switch means.

It is therefore an object of the invention to provide a circuit which improves the operational capability of a data terminal.

A further object of the invention is to provide a circuit which permits automatic or manual operation of a data terminal with two separate communication networks.

Further objects and features of the invention will be apparent from the following specification and claims when considered in connection with the accompanying drawings illustrating the preferred embodiment of the invention.

DESCRIPTIONN OF THE DRAWINGS

Figure 1:
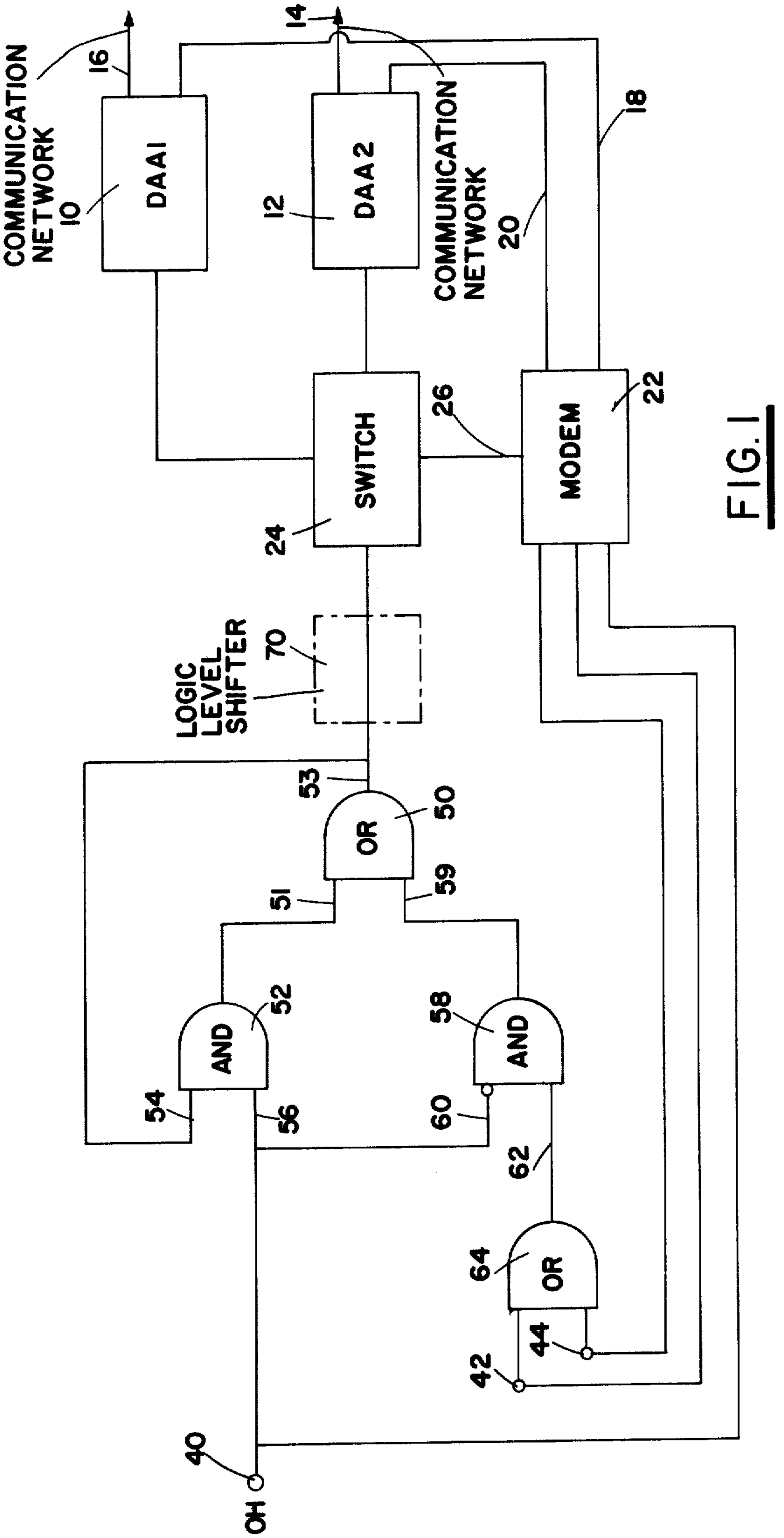
FIG. 1 is a logic block diagram illustrating the operation of the preferred embodiment of the invention.

In describing the preferred embodiments of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the terms "connection" or "connect" are often used and are not to be limited to direct connection but include connection through other devices where such interposition of other devices would be understood as being equivalent by those skilled in the art. Connection includes connection through suitable interfacing circuits or switches where such devices effectively provide a connection.

DETAILED DESCRIPTION

FIG. 1 illustrates generally the preferred embodiment of the invention. A pair of direct access arrangement terminal units 10 and 12 are connected to separate communication networks at 14 and 16. The DAA terminal units 10 and 12 are provided with a plurality of connectors or binding posts. These include RI terminals at each unit which are directly connected through wires 18 and 20 to the modem 22 and also include DA, OH, DR and DT terminals. The abbreviated terms CBT, OH, RI, DA, DR and DT are defined and utilized in the "Bell System Data Communication" publication "Data Couplers CBS and CBT for Automatic Terminals" August 1970.

The modem 22 includes ring detectors which are connected preferably to the RI terminals of the DAA terminal units 10 and 12 through the wires 18 and 20. The ring detectors may be required to convert the ring signals to suitable logic levels for processing 64 the logic circuitry of the modem 22. For example, it may be necessary to convert the opened and closed contact states of CBT system to voltage level shifts appropriate for the logic circuitry. However, in some applications, where the states of the RI terminals are suitable, the conductors 18 and 20 may be equivalent to the output of a ring detector. Ring detectors also provide time delays so that they can provide a continuous output level shift during a ring signal. Because ring detector circuits are known in the art and do not form a direct element of the present invention, the details of a ring detector are not illustrated.

The other connections of the DAA terminal units 10 and 12 are connected to the modem 22 through a switch means 24. For example, the DA, OH, DR, and DT connections may be connected to the modem through conductors indicated as 26.

Figure 2:
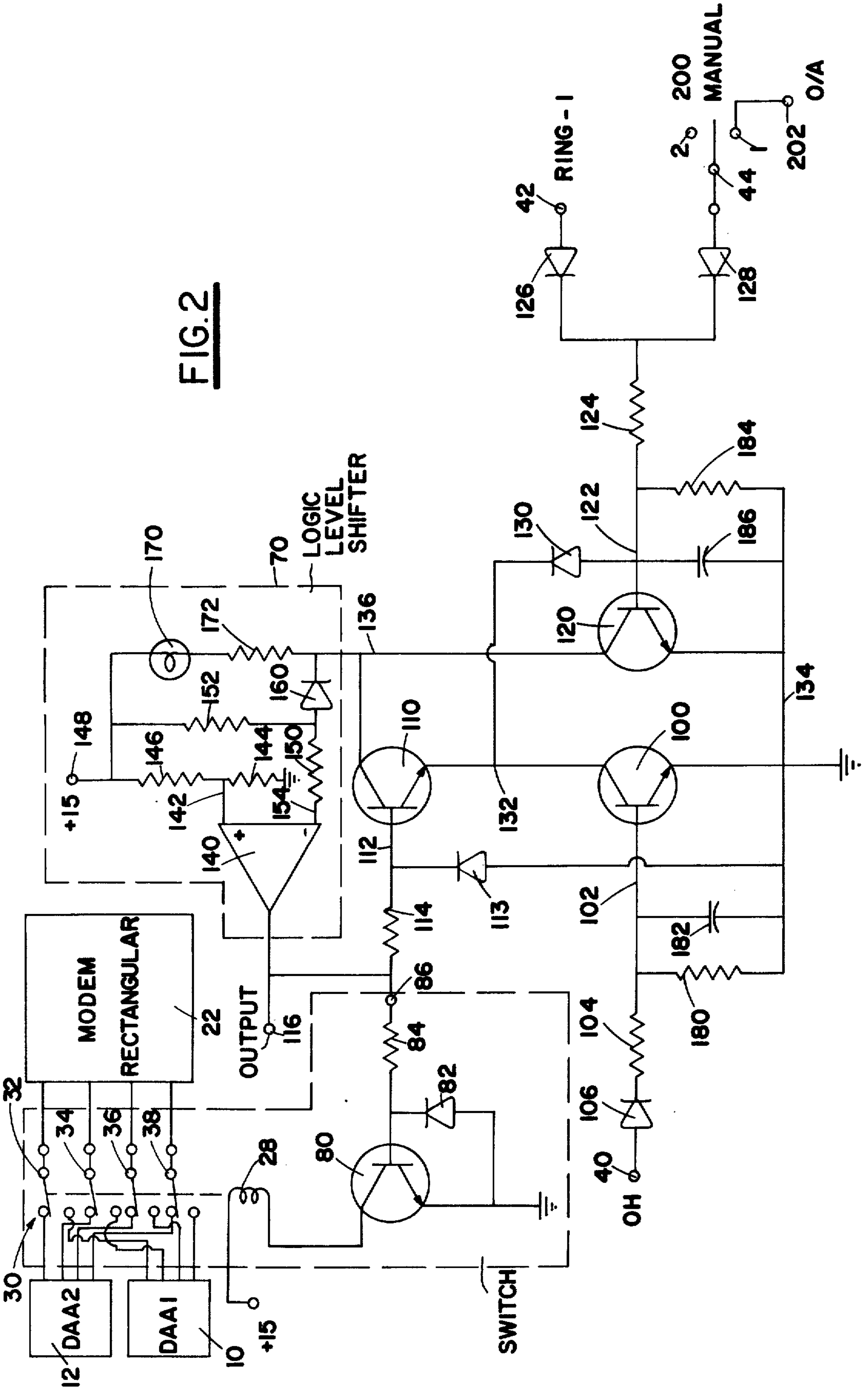
FIG. 2 is a schematic diagram of the preferred embodiment of the invention.

The switch means 24 is illustrated in more detail in FIG. 2. It may, for example, include a multiple pole, double throw, electrically operated switch means such as the relay 28 which is connected to the terminal units 10 and 12 by its stationary contacts indicated generally as 30. The wiper contacts 32, 34, 36, and 38 are connected to the modem 22 of the data terminal. Therefore, the relay 28 connects the modem 22 to the first DAA terminal unit 10 when the relay 28 is actuated and connects the modem 22 to the second DAA terminal unit 12 when the relay 28 is not actuated.

Returning to FIG. 1, the switch means 24 is controlled by a logic circuit connected to it. An input 40 to the logic circuit is connected to the output of an OH circuit in the modem 22. This OH circuit which is also present in conventional modems, shifts its output from a first to a second logic level when the data terminal is off hook and returns to the first level when the data terminal is on hook.

Another input 42 to the logic circuit is connected to the output of the particular ring detector which is connected to the first DAA terminal unit 10. There is no connection between the logic circuit and the ring detector of the second DAA terminal unit 12.

Finally, another input 44 of the logic circuit is connected to a manual switch on the control panel of the modem 22. The manual switch may be a single pole single throw switch which is switched to one position to manually cause connection of the modem 22 to the first DAA terminal unit 10 and is switched to a second position to cause connection of the modem 22 to the second DAA terminal unit 12.

The logic circuit itself includes a first OR gate 50 having its output 53 effectively connected to the switch means 24 for at times actuating the switch means 24. A first AND gate 52 has its output connected to an input 51 of the OR gate 50. One of its inputs 54 is connected to the output 53 of the first OR gate 50. Its other input 56 is connected to the OH circuit in the modem 22 at the large circuit input 40.

A second AND gate 58 haas its output connected to an input 59 of the first OR gate 50. This second AND gate 58 has an inverting input 60 connected to the output of the OH circuit at logic input 40. It also has a second input 62 connected through a second OR gate 64 to the output of the ring detector connected at logic input 42. The circuit however would operate if the manual input 44 were eliminated and the ring input at 42 were directly connected to the input 62 of the second AND gate 58. Such simplification would only eliminate the manual selection function.

However, inclusion of OR gate 64 permits connection of its input 44 to the manual selection switch of the modem 22.

The operation of the simplified circuit illustrated in FIG. 1 may be conveniently seen from the drawing. The occurrence of either a ring state at the input 42 or a manual selection state at the input 44 will provide an input signal at the input 52 of the second AND gate 58. If the on hook state is present at the input 60 of AND gate 58 then the output of the AND gate 58 will be gated through the OR gate 50 to actuate the switch means 24. When the switch means 24 is actuated, the modem 22 will be connected to the first DAA terminal unit 10.

The modem 22 will now answer the incoming call in response to this ring signal and consequently will shift its OH circuit to an off hook state. Therefore, the off hook state at the input 56 of the AND gate 52 occuring simultaneously with the actuated state of the switch means 24 will operate the AND gate 52 and, acting through the OR gate 50 will maintain the switch means 24 in an actuated state.

When the communication is ended, the OH circuit of the modem 22 will switch to its on hook state. This will deactuate the switch means 24 and connect the DAA terminal unit 12 to the modem 22.

If a call comes in on the transmission line 14, the DAA terminal unit 12 is already connected to the modem 22 so that no switching of the switch means 24 is necessary. If during communication through the DAA terminal unit 12, a ring signal arrives at the DAA terminal unit 10, the presence of an off hook state at the input 60 of the AND gate 58 will prevent this ring signal from switching the switch means 24 to its actuated state.

It may be desirable at times to include a logic level shifting device 70 between the output of the first OR gate 50 and the switch means 24. Such an interface will merely convert the two logic levels at the output of the OR gate 50 to a different set of logic levels at the input of the switch means 24.

From the above consideration of the operation of the circuit in FIG. 1, it can be seen that the logic circuit generates the Boolean logic function:

$$R.O' + O.X + M.O' = X$$

where R is a ring state at the output of the ring detector; O represents an off hook state at the output of the OH circuit; X represents the actuated state of the switch means 24; and M represents the manual selection of the first DAA terminal unit 10. Elimination of the manual selection switch results in the simplified Boolean logic function:

$$R.O' + O.X = X$$

Referring now to FIG. 2, the preferred embodiment of the invention is seen in more detail. The switch means 24 includes not only the relay 28 described above but includes a switching transistor 80 protected by a diode 82 and having input resistance 84. The transistor 80 switches the relay 28 in response to the voltage levels present at its input 86.

The logic circuit itself has a first transistor switch 100 with its input 102 connected through a resistor 104 and diode 106 to the output of the OH circuit at terminal 40. In the preferred embodiment, a +15 volt logic level indicates an off hook state and a −15 volt logic level indicates an on hook state. Consequently, the first transistor switch 100 is turned on in response to an off hook state and is turned off in response to an on hook state.

A second transistor switch 110 is series connected to the first transistor switch 100. Its input 112, shunted by protective diode 113, is connected through a resistance 114 to the output 116 of the logic circuit. In the preferred embodiment a +15 volt level at the output 116 is the state which connects the data terminal to the first DAA terminal unit 1 and therefore is the state which actuates the relay 28. A −15 volt logic level at the output 116 represents the state at which the relay 28 is not energized and consequently the state at which a data terminal is connected to the second DAA terminal unit 12. Consequently, the second transistor switch 110 is turned on during actuation of the switch means 24.

A third transistor switch 120 is connected parallel to the series connected transistors 100 and 110. Its input 122 is connected through a resistor 124 and a diode 126 to the ring detector at terminal 42. In the preferred embodiment of the invention a +15 volt level represents the occurrence of a ring signal and a −15 volt level represents a absence of a ring signal. Consequently, the third transistor switch 120 is turned on in response to a ring state at the ring detector input 42.

A second diode 128 connects the input 122 of the third transistor switch 120 to a manual selection input at the terminal 44. The diodes 126 and 128 together form a conventional OR gate. Therefore, a +15 volt level at the input 44 similarly brings the third transistor switch 120 into conduction.

A third diode 130 connects the input 122 of the third transistor switch 120 to the node 132 which is intermediate the first transistor switch 100 and the second transistor switch 110.

The first transistor switch 100 and the third transistor switch 120 are connected to the common ground 134. A logic level shifting interface circuit is interposed between the output 116 of the logic circuit and the nongrounded end 136 of the parallel connected third transistor 120 and the first and second transistors 100 and 110.

The logic level shifting interface circuit 70 has a high gain, differential comparator 140 with its non-inverting input 142 biased to an intermediate reference level by voltage dividing resistances 144 and 146 connected to the power supply 148. For example, the preferred intermediate level to which the input 142 is biased is 7.5 volts.

A pair of resistances 150 and 152 connect the inverting input 154 of the comparator 140 to the voltage supply 148. A diode 160 connects the node 162 between the resistances 150 and 152 to the nongrounded end 136 of the transistor switches 100, 110 and 120.

Whenever the diode 160 is reverse biased, the resistances 150 and 152 pull the inverting input 154 of the comparator 140 to a voltage of the same polarity but of greater magnitude than the biased reference level at the input 142. However, whenever either of the parallel paths through the transistor 120 or the transistors 100 and 110 provide a circuit to ground, the nonground end 136 will effectively connect the cathode of the diode 160 to ground. This will pull the node 162 between the resistances 150 and 152 effectively near ground to switch the voltage at the input 154 of the comparator 140 to a magnitude smaller than the reference voltage applied at the non-inverting input 142. The result of that will be a switch in the output level at the output 116 from the comparator 140 from a −15 volt level to a +15 volt level.

A pilot light 170 with current limiting resistance 172 is connected between the power supply 148 and the nongrounded node 136 so that the pilot light 170 be illuminated when either the transistor 120 is switched on or the transistors 100 and 110 are switched on.

A first shunt resistance 180 and capacitance 182 are shunted across the input of the first transistor switch 100. They provide a suitable time delay for holding the transistor switch 100 in a turned on state for a selected time delay interval after the end of an off hook state.

Similarly, a second shunt resistance 184 and capacitance 186 are shunted across the input of the third transistor switch 120. They similarly provide a time delay for holding the third transistor switch 120 on for a selected time period after the end of a ring state at the ring detector input 42.

The operation of the preferred embodiment illustrated in FIG. 2 may be considered first by assuming a steady state condition in which the data terminal is on hook are there are no ring signals. In this state, the transistor switches 100 110 and 120 will be nonconducting. Consequently, the diode 160 will be reverse biased so that the positive voltage at the inverting input 154 of the comparator 140 will be of greater magnitude than the reference voltage at its noninverting input 142. This will provide a −15 volt logic level at the output 116 of the comparator 140. This output voltage at the output 116 is applied at the input 112 of the second transistor switch 110 to hold it in a nonconducting state.

In this steady state the input at the OH terminal 40 will be at a −15 volt on hook logic level to reverse bias the input diode 106 and therefore permit the input resistance 180 to maintain the first transistor switch 100 in a nonconducting state. Similarly, the inputs at the ring terminal 42 and the manual terminal 44 will be at −15 volt logic levels to hold the third transistor switch 120 in a nonconducting state.

When the output 116 of the logic circuit 15 at a −15 volt logic level, the relay control transistor 80 will be nonconducting and therefore the relaay 28 will be in its normal, unactuated condition. This condition connects the modem circuitry to the second DAA terminal unit 12.

The occurrence of a ring signal at the second DAA terminal unit 12 will not change these steady state conditions. However, when the modem answers such a ring, the OH terminal 40 will go to a +15 volt logic level which will forward bias the input diode 106 and cause the first transistor 100 to begin conducting.

By switching the first transistor switch 100 into conduction, the cathode of the diode 130 is connected substantially to ground. Therefore, if a ring signal occurs at input 42 or if a manual input occurs at input 44 while the modem is off hook, such an input will be shorted to ground through the diode 130 and therefore will be unable to bring the transistor 120 into conduction. Consequently, while the modem is off hook answering a call from one DAA terminal unit it can not switch to answer a call from the other DAA terminal unit.

Of course, when the data terminal again goes on hook, the OH terminal 40 will switch to its −15 volt level bringing the first transistor switch 100 to nonconduction.

The occurrence of a ring signal at the ring input 42 when the data terminal is on hook will first switch the third transistor 120 into conduction. This will effectively connect the cathode of the diode 150 to ground and thereby reduce the voltage at the inverting input 154 to a level less than the reference voltage at the noninverting input 142. The output of the comparator 140 will therefore switch to a +15 volt level which, in turn, will switch the second transistor switch 110 into conduction. Simultaneously, this level change in the output of the comparator 140 will turn on the transistor 80 and therefore actuate the relay 28. That will connect the modem to the first DAA terminal unit 10.

The modem will now answer the call coming in through the first DAA terminal unit 10 so that the OH terminal 40 will switch to its positive, off hook logic level. That will bring the transistor 100 into conduction. Thus, when the ring signal ends because the modem has answered and gone off hook, the lost current path through the transistor 120 is replaced by the parallel current path through the series transistors 100 and 110. This parallel current path now holds the cathode of the diode 160 effectively at ground to maintain the output of the comparator 140 at its positive level and therefore to maintain the relay in an actuated condition.

Finally, when the call through the first DAA terminal unit 10 is completed, the modem will switch to its on hook state and return the logic circuitry of FIG. 2 to its steady state described above.

Manual selection is provided by a switch 200 which switches to an open circuit at a terminal 2 to select connection of the modem to the second DAA terminal unit 12. Connection to the first DAA terminal unit 10 is selected by switching this switch 200 to its terminal 1 which effectively connects the diode 128 to a +15 volt level. Therefore the input terminal 202 of the manual selection switch 200 may be connected to a +15 volt power supply.

However, improved operation may be obtained if the terminal 202 is connected to an originate/answer circuit which provides a +15 volt level when the modem is switched to an originate mode and which provides a −15 volt level when the modem is switched to an answer mode. Consequently, manual selection of the first DAA terminal unit 10 is effective only when the modem is switched to its originate mode. If it is switched to its answer mode, the manual selection will be ineffective. This is appropriate because the particular DAA terminal unit should be selected manually only when the modem is in a manual mode such as originate. In the answer mode, the logic circuitry will automatically answer the appropriate DAA terminal unit.

It is to be understood that while the detailed drawings and specific examples given describe preferred embodiments of the invention, they are for purposes of illustration only that the apparatus of the invention is not limited to the precise details and conditions disclosed and that various changes may be made therein without departing from the spirit of the invention which is defined by the following claims.

What is claimed is:

1. A circuit for selecting and alternatively connecting a data terminal to one of two direct access arrangement (DAA) terminal units, said data terminal including a ring detector connected to a first of said DAA units for shifting from a first to a second logic level in response to a ring signal and including an OH circuit for shifting its output from a first to a second logic level when said data terminal is off hook; said circuit comprising:

a. a multiple pole, double throw, electrically operated switch means connected to said DAA terminal units and having wiper terminals connected to said data terminal, for connecting said data terminal to a first one of said DAA terminal units when said switch means is actuated and for connecting said data terminal to the other DAA terminal unit when said switch means is not actuated; and b. logic circuit means connected to said switch means and having inputs connected to the output of said ring detector and the output of said off-hook (OH) circuit for actuating said switch means in response to the simultaneous existence of a ring signal at said ring detector and an on hook state and for holding said switch means in an actuated state in response to simultaneous existence of an off hook state and an actuated switch means.

c. said logic circuit means further including a first transistor switch having its input connected to said OH circuit for being turned on in response to an off hook state and for being turned off in response to an on hook state;

d. a second transistor switch series connected to said first transistor switch and having its input effectively connected to the output of said logic circuit means for being turned on when said switch means is activated;

e. a third transistor switch connected parallel to said series connected first and second transistor switches and having its input connected to said ring detector for being turned on in response to a ring state at said ring detector; and f. a diode connecting the input of said third transistor switch to the node intermediate the first and second transistor switches.

2. A circuit according to claim 1 wherein said logic circuit means comprises:

a. a first OR gate having its output effectively connected to said switch means for actuating said switch means;

b. a first AND gate having its output connected to an input of said first OR gate and having a pair of inputs, one input connected to the output of said OR gate and the other input connected to said OH circuit; and c. a second AND gate having its output connected to another input of said first or gate, the second AND gate having an inverting input connected to said OH circuit and having a second input effectively connected to said ring detector.

3. A circuit according to claim 2 wherein a second OR gate is interposed between said second input of said second AND gate and said ring detector and wherein a manual selection switch is connected to another input of said second OR gate for additionally actuating said switch means in response to the simultaneous existence of an on hook state and a manual selection of said first DAA terminal unit.

4. A circuit according to claim 3 wherein said logic circuit means includes a logic level shifting interface interposed between the output of said first OR gate and said switch means.

5. A circuit according to claim 1 wherein said logic circuit means comprises logic circuit for generating the Boolean logic function:

$$R \cdot O' + O \cdot X = X$$

where R represents a ring state at the output of said ring detector, O represents an off hook state and X represents the actuated state of said switch means.

6. A circuit according to claim 1 wherein said logic circuit means comprises a logic circuitry for generating the Boolean logic function:

$$R \cdot O' + O \cdot X + M.O' = X$$

where R represents a ring state at the output of said ring detector, O represents an off hook state, X represents the actuated state of said switch means and M represents a manual selection of said first DAA terminal unit.

7. A circuit according to claim 1 wherein said first transistor switch and said third transistor switch are connected to a common ground and wherein a logic level shifting circuit is interposed between the output of said logic circuit means and the non-grounded end of said parallel third transistor switch and first and second transistor switches.

8. A circuit according to claim 7 wherein a first diode connects the input of said third transistor switch to said ring detector and a second diode connects the input of said third transistor switch to a manual selection switch for additionally turning on said second switch in response to manual selection of said first DAA terminal unit.

9. A circuit according to claim 8 wherein a first shunt resistance and capacitance are shunted across the input of said first transistor switch for holding it in a turned on state a selected time delay after the beginning of an on hook state and wherein a second shunt resistance and capacitance are shunted across the input of said third transistor switch for holding it on for a selected time period after the end of a ring state at said ring detector.

10. A circuit according to claim 7 wherein said logic level shifting circuit means comprises:

a. a differential comparator having one input biased to an intermediate reference level and having its output connected to the output of said logic circuit means;

b. a pair of series resistances connecting the other input of said comparator to a voltage supply for biasing said other input to a voltage of the same polarity and greater magnitude than said reference level; and c. a diode connecting the node intermediate said two series resistances to said nongrounded end for pulling said other comparator input to a voltage less than said reference when one of the parallel paths through said first, second, and third transistor switches provides a closed circuit to ground.

* * * * *